Patented Jan. 21, 1936

2,028,654

UNITED STATES PATENT OFFICE 2,028,654

PROCESS FOR THE PREPARATION OF ETHERS HAVING AT LEAST 8 CARBON ATOMS IN THE MOLECULE

Eberhard Elbel, Dusseldorf, Germany, assignor to Henkel & Cie. G. m. b. H., Dusseldorf, Germany No Drawing. Application March 14, 1933, Serial No. 660,774. In Germany March 26, 1932

17 Claims. (Cl. 260—151)

It has been found that ethers, which contain at least 8 carbon atoms in the molecule, may be manufactured in a very simple and easy manner by allowing the esters of higher aliphatic or hydroaromatic alcohols and oxyacids to react with alcohols or phenols in an alkaline medium, or with alcoholates or phenolates. The reaction proceeds with technically very satisfactory yields.

As esters of higher aliphatic or hydroaromatic alcohols and oxyacids it is possible to employ, for example, the sulphuric acid or phosphoric acid esters of alcohols, such as dodecyl alcohol, myristic alcohol, cetyl alcohol, oleic alcohol, cyclohexyl alcohol, resin alcohols, naphthene alcohols or their mixtures and the like.

Alcohols, such as methyl alcohol, butyl alcohol, dodecyl alcohol, phenols, naphthols and the like may be allowed to react in an alkaline medium with such esters; of course the reaction may also be carried out with the corresponding alcoholates or phenolates.

The reaction components, in their turn, may be substituted by groups of any kind, provided such groups are incapable of exerting an unfavorable influence upon the reaction. Such groups are, for example: ether groups, sulpho groups, alkyl residues, aryl residues and the like.

The reaction of the said esters with polyhydric alcohols results in particularly valuable products, it being possible to obtain either multiple ethers or ethers substituted by hydroxy groups, according to the reaction conditions.

For example, the said esters may advantageously be allowed to react with the monoalcoholates or glycol or glycerol.

The products obtained are suitable for use, for example as softening agents, or in the cosmetic industry and the like. Furthermore, they may serve as starting substances for the preparation of other valuable compounds.

Examples 1. 8 parts of sodium metal are dissolved in a finely divided form in 100 parts of anhydrous glycol. The solution of sodium glycol in glycol thus obtained is mixed with the warm solution of 100 parts of the sodium salt of the sulphuric acid ester of dodecyl alcohol in 200 parts of anhydrous glycol. The resulting mixture is heated to boiling for 5 hours, $Na_2SO_4$ very soon beginning to separate out from the solution. After cooling, the mixture is diluted with twice its amount of hot water, is acidified with a little hydrochloric acid and is boiled for 10 minutes. The oil separating out at the top is siphoned off and distilled in a vacuum. The $\beta$-hydroxy-ethyl-dodecyl-ether is obtained in an excellent yield. Boiling point 170 to 174° C. under a pressure of 15 mm.

2. 37.7 parts of the monosodium compound of glycerol, obtainable by means of a solution of caustic soda, are dissolved in 200 parts of pure glycerol by heating for a long time to about 200° C. This solution is mixed, at the same temperature, with a solution of 109 parts of the commercial sodium salt of dodecyl-sulphuric acid ester (87.7%) and 300 parts of pure glycerol, and is heated, while being vigorously agitated, for 5 hours at about 190° to 200° C. After cooling, the mixture is diluted with twice its amount of hot water, is acidified with a little hydrochloric acid and is heated to boiling for 10 minutes. The layer of oil separating out at the top is siphoned off and is distilled after drying at about 120° C. in a vacuum. The $\beta$-$\gamma$-dihydroxy-propyl-dodecyl-ether is obtained in a very good yield as an oily liquid which, on cooling, sets to a tallow-like mass. Boiling point: 210° to 215° C. under a pressure of 15 mm.

3. 118.6 grams of monosodium glycerol are dissolved in 500 grams of glycerol at 150° C., and 300 grams of sodium dodecyl-sulphate and 800 grams of glycerol are added thereto. On raising the temperature to 180° C., solution very rapidly occurs and on stirring well and gradually raising the temperature to 215° C., the reaction is completed in 8 to 9 hours. The reaction mixture is then introduced into twice its quantity of hot water, is very slightly acidified with hydrochloric acid and is heated almost to boiling. After cooling, the aqueous layer is siphoned off from the semi-solid reaction product floating on the top. The product, after being washed repeatedly with hot water and hot dilute brine, is freed in a vacuum from the water still adhering to it, and is fractionated at a pressure of 3 mm. After a moderate amount of first runnings, the glycerol monododecyl ether distils over almost constant at 198° C.

4. 38 grams of sodium glycerol are dissolved in 200 grams of glycerol and 106 grams of sodium tetradecyl sulphate and 300 grams of glycerol are added thereto. The mixture is heated for 6 hours at 190° C. to 210° C., while being vigorously agitated, and is then worked up as in Example 3. The glycerol monotetradecyl ether obtained has a boiling point of 206° C. to 207° C. under a pressure of 3 mm.

5. 35 grams of sodium glycerol are allowed to react in 400 grams of glycerol with 104 grams of sodium hexadecyl sulphate and are worked up as in Example 4. The glycerol monohexadecyl ether produced has a boiling point of 205° to 206° C. under a pressure of 1 mm.

6. 34.2 grams of sodium glycerol are allowed to react in 400 grams of anhydrous glycerol with 111.6 grams of sodium octodecyl sulphate for 8 hours at 210° to 215° C., and are worked up as in the preceding examples. The glycerol mono-octodecyl ether produced has a boiling point of 215° to 220° C. at a pressure of 2 mm. (slight decomposition).

7. 57.6 parts by weight of sodium dodecyl sulphate and 23.2 parts by weight of sodium phenolate are heated for several hours to 160° C. in 150 parts by weight of phenol. The reaction product is poured into water, the oily layer is separated in a separating funnel from the aqueous layer and is repeatedly washed with hot water. The reaction product is distilled in a vacuum of 2 mm. pressure, the main portion passing over between 162° and 165° C. The water-clear distillate sets on cooling to a colourless, crystalline mass having a melting point of 25° C.

I claim:

1. The process for the preparation of ethers having at least 8 carbon atoms in the molecule, characterized in that the acid esters which are obtained from polybasic oxygen containing mineral acids and non-aromatic alcohols of the group consisting of aliphatic alcohols containing at least 12 carbon atoms and hydroaromatic alcohols, are reacted with organic hydroxy compounds of the group consisting of alcohols and phenols in an alkaline medium.

2. The process for the preparation of ethers having at least 8 carbon atoms in the molecule, characterized in that the acid esters which are obtained from polybasic oxygen containing mineral acids and non-aromatic alcohols of the group consisting of aliphatic alcohols containing at least 12 carbon atoms and hydroaromatic alcohols, are reacted with aliphatic alcohols in an alkaline medium.

3. The process for the preparation of ethers, characterized in that the acid esters which are obtained from polybasic oxygen containing mineral acids and non-aromatic alcohols of the group consisting of aliphatic alcohols containing at least 12 carbon atoms and hydroaromatic alcohols, are reacted with phenols in an alkaline medium.

4. The process for the preparation of ethers, characterized in that the acid esters which are obtained from polybasic oxygen containing mineral acids and aliphatic alcohols containing at least 12 carbon atoms, are reacted with organic hydroxy compounds of the group consisting of alcohols and phenols in an alkaline medium.

5. The process for the preparation of ethers, characterized in that the acid esters which are obtained from polybasic oxygen containing mineral acids and aliphatic alcohols containing at least 12 carbon atoms, are reacted with alcohols in an alkaline medium.

6. The process for the preparation of ethers, characterized in that the acid esters which are obtained from polybasic oxygen containing mineral acids and aliphatic alcohols containing at least 12 carbon atoms, are reacted with phenols in an alkaline medium.

7. The process for the preparation of ethers having at least 8 carbon atoms in the molecule, characterized in that the acid esters which are obtained from polybasic oxygen containing mineral acids and non-aromatic alcohols of the group consisting of aliphatic alcohols containing at least 12 carbon atoms and hydroaromatic alcohols, are reacted with alcoholates.

8. The process for the preparation of ethers, characterized in that the acid esters which are obtained from polybasic oxygen containing mineral acids and non-aromatic alcohols of the group consisting of aliphatic alcohols containing at least 12 carbon atoms, and hydroaromatic alcohols are reacted with phenolates.

9. The process for the preparation of ethers, characterized in that the acid esters which are obtained from polybasic oxygen containing mineral acids and aliphatic alcohols containing at least 12 carbon atoms, are reacted with alcoholates.

10. The process for the preparation of ethers, characterized in that the acid esters which are obtained from polybasic oxygen containing mineral acids and aliphatic alcohols containing at least 12 carbon atoms, are reacted with phenolates.

11. The process for the preparation of ethers having at least 8 carbon atoms in the molecule, characterized in that the acid esters which are obtained from sulphuric acid and non-aromatic alcohols of the group consisting of aliphatic alcohols containing at least 12 carbon atoms and hydroaromatic alcohols, are reacted with organic hydroxy compounds of the group consisting of alcohols and phenols in an alkaline medium.

12. The process for the preparation of ethers, characterized in that the acid esters which are obtained from sulphuric acid and aliphatic alcohols containing at least 12 carbon atoms, are reacted with alcoholates.

13. The process for the preparation of ethers, characterized in that the acid esters which are obtained from sulphuric acid and aliphatic alcohols containing at least 12 carbon atoms, are reacted with phenolates.

14. The process for the preparation of ethers, characterized in that the acid esters which are obtained from sulphuric acid and aliphatic alcohols containing at least 12 carbon atoms, are reacted with alcoholates of polyhydric alcohols.

15. As new products of manufacture, monoalkyl-ethers of glycerol of the structural formula

R—O—CH₂—CHOH—CH₂OH where R is a member of the group consisting of the dodecyl and the tetradecyl radical.

16. A new product of manufacture, consisting of the glycerol mono-dodecyl ether of the structural formula

C₁₂H₂₅—O—CH₂CHOH—CH₂OH

17. A new product of manufacture, consisting of the glycerol mono-tetradecyl ether of the structural formula

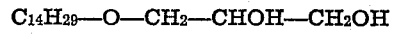

C₁₄H₂₉—O—CH₂—CHOH—CH₂OH

EBERHARD ELBEL.